US011952133B2

(12) United States Patent
Fujiwara

(10) Patent No.: US 11,952,133 B2
(45) Date of Patent: Apr. 9, 2024

(54) MOTOR-INTEGRATED FLUID MACHINE AND VERTICAL TAKEOFF AND LANDING AIRCRAFT

(71) Applicant: MITSUBISHI HEAVY INDUSTRIES, LTD., Tokyo (JP)

(72) Inventor: Naoaki Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 377 days.

(21) Appl. No.: 17/426,381

(22) PCT Filed: Jan. 14, 2020

(86) PCT No.: PCT/JP2020/000805
§ 371 (c)(1),
(2) Date: Jul. 28, 2021

(87) PCT Pub. No.: WO2020/166250
PCT Pub. Date: Aug. 20, 2020

(65) Prior Publication Data
US 2022/0161937 A1 May 26, 2022

(30) Foreign Application Priority Data
Feb. 12, 2019 (JP) .................................. 2019-022928

(51) Int. Cl.
*B64D 27/24* (2006.01)
*B64C 11/00* (2006.01)
(Continued)

(52) U.S. Cl.
CPC ............ *B64D 27/24* (2013.01); *B64C 11/001* (2013.01); *F04D 19/02* (2013.01);
(Continued)

(58) Field of Classification Search
CPC ... B64C 11/001; B64C 27/20; B64C 29/0016; B64C 11/18; B64C 11/48;
(Continued)

(56) References Cited

U.S. PATENT DOCUMENTS 3,708,251 A 1/1973 Pierro
4,459,087 A 7/1984 Barge
(Continued)

FOREIGN PATENT DOCUMENTS

DE 102011054849 1/2013
JP 2001-97288 4/2001
(Continued)

OTHER PUBLICATIONS

Notice of Reasons for Refusal dated Dec. 13, 2022 in corresponding Japanese Patent Application No. 2019-022928, with English language translation.
(Continued)

*Primary Examiner* — Eric J Zamora Alvarez
(74) *Attorney, Agent, or Firm* — Wenderoth, Lind & Ponack, L.L.P.

(57) ABSTRACT

A motor-integrated fan having an intake port and a blow-out port comprises a rotary part 12 that is rotatably supported by a shaft, and a motor 14 that rotates the rotary part 12. The motor 14 is an outer periphery drive motor that rotates the rotary part 12 by supplying motive power from a duct provided on the outer peripheral side of the shaft. The motor 14 includes: a permanent magnet 45 provided on a rotary support ring 33 connected to the outer peripheral side of blades 32 of the rotary part 12; and a coil 46 provided opposite the permanent magnet 45 in the axial direction of the axis of rotation. Among the plurality of blades 32, a first blade 32*a* and a second blade 32*b* are located at different positions in the axial direction.

8 Claims, 4 Drawing Sheets

(51) Int. Cl.
    *B64C 29/00*     (2006.01)
    *F04D 19/02*     (2006.01)
    *F04D 25/06*     (2006.01)
    *F04D 29/32*     (2006.01)
    *H02K 1/17*     (2006.01)
    *H02K 1/2793*     (2022.01)
    *H02K 7/00*     (2006.01)
    *H02K 7/14*     (2006.01)

(52) U.S. Cl.
    CPC ....... *F04D 25/0606* (2013.01); *F04D 29/326* (2013.01); *H02K 1/17* (2013.01); *H02K 1/2793* (2013.01); *H02K 7/006* (2013.01); *H02K 7/14* (2013.01)

(58) Field of Classification Search
    CPC ..... B64C 2230/28; B64C 27/12; B64C 27/14; B64C 27/46; B64C 29/00; B64C 1/061; B64C 11/04; B64C 11/44; B64C 21/025; B64C 21/08; B64C 2230/06; B64C 29/0025; B64D 27/24; F04D 25/0606; F04D 25/066; F04D 29/325; F04D 19/02; F04D 25/06; F04D 29/321; F04D 29/326; F01D 5/146; F01D 9/02; F05B 2240/33; H02K 1/17; H02K 1/2793; H02K 7/006; H02K 7/14
See application file for complete search history.

(56) References Cited

U.S. PATENT DOCUMENTS

| | | |
|---|---|---|
| 4,483,658 A | 11/1984 | Levine |
| 4,953,811 A | 9/1990 | Smith |
| 5,185,545 A * | 2/1993 | Veronesi ................ B63H 21/17 310/90 |
| 10,086,933 B2 | 10/2018 | Roberts et al. |
| 2011/0272520 A1 | 11/2011 | Ruan et al. |
| 2017/0104385 A1 | 4/2017 | Salamon et al. |
| 2017/0174337 A1 | 6/2017 | Roberts et al. |

FOREIGN PATENT DOCUMENTS

| | | |
|---|---|---|
| JP | 2017-109726 | 6/2017 |
| JP | 2019-500277 | 1/2019 |
| WO | 2017/106617 | 6/2017 |

OTHER PUBLICATIONS

Communication pursuant to Article 94(3) EPC dated Aug. 26, 2022 in corresponding European Patent Application No. 2075 5522.8
International Search Report dated Mar. 17, 2020 in corresponding International (PCT) Patent Application No. PCT/JP2020/000805.
Written Opinion dated Mar. 17, 2020 in corresponding International (PCT) Patent Application No. PCT/JP2020/000805, with English translation.

* cited by examiner

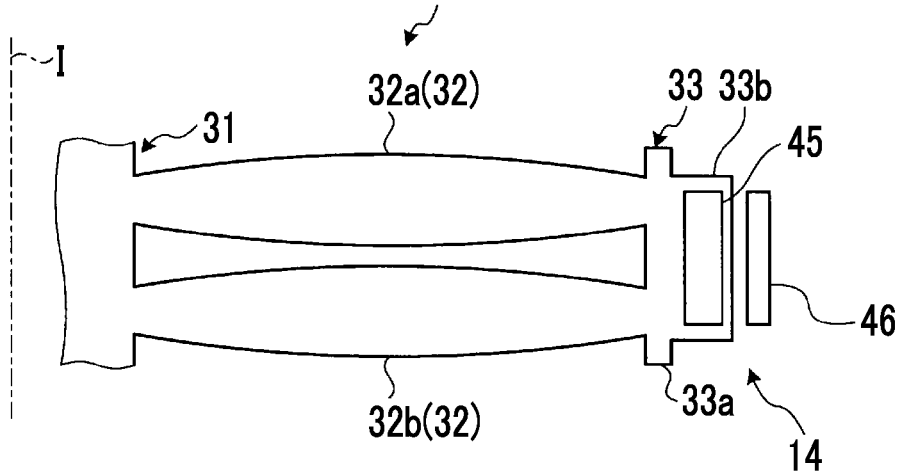

MOTOR-INTEGRATED FLUID MACHINE AND VERTICAL TAKEOFF AND LANDING AIRCRAFT

TECHNICAL FIELD

The present invention relates to a motor-integrated fluid machine and a vertical takeoff and landing aircraft.

BACKGROUND ART

In the related art, there is known a ring motor including a stator, a rotor, and a plurality of propeller blades (for example, refer to Japanese Unexamined Patent Application Publication No. 2017-109726). The stator includes a stator support ring, and a plurality of windings that are disposed in a circumferential direction of the fixed support ring. A plurality of pitch blades are joined to the stator support ring. The rotor includes a rotor support ring, a plurality of magnetic poles disposed in the circumferential direction of the rotating support ring, and a central hub. The central hub is joined to a portion of the stator. The plurality of propeller blades are joined to the rotating support ring. For this reason, by virtue of the windings and the magnetic poles, the rotor rotates around the central hub joined to the stator, so that the plurality of propeller blades rotate.

Patent Literature

In a motor-integrated fluid machine such as the ring motor of Japanese Unexamined Patent Application Publication No. 2017-109726, when blades rotate to generate thrust, the generated thrust acts on the blades. At this time, since a plurality of the blades are supported on a shaft portion such as a hub, a tip side (free end side) of the blades is displaced by the thrust. When the blades are displaced, a rotating support ring is displaced in an axial direction of a rotation axis with the displacement of the blades, so that a plurality of magnetic poles provided in the rotating support ring are also offset in position with respect to a plurality of windings. For example, when a gap between the magnetic pole and the winding is widened due to deviation in positional relationship between the plurality of magnetic poles and the plurality of windings, the performance of a motor deteriorates, thus resulting in a decrease in thrust.

Therefore, an object of the present invention is to provide a motor-integrated fluid machine and a vertical takeoff and landing aircraft capable of suppressing deterioration in performance of a motor, which is due to the rotation of blades.

SUMMARY OF THE INVENTION

According to an aspect of the present invention, there is provided a motor-integrated fluid machine that suctions a fluid from a suction port and discharges the suctioned fluid from a discharge outlet, the machine including: a shaft portion provided at a center of a rotation axis; a rotating portion that rotates around the shaft portion; an outer peripheral portion provided on an outer periphery of the shaft portion; and a motor that rotates the rotating portion. The rotating portion is rotatably supported on the shaft portion, so that a shaft portion side is a fixed end side and an outer peripheral portion side is a free end side. The motor is an outer peripheral drive motor that applies power from the outer peripheral portion to rotate the rotating portion. The rotating portion includes a plurality of blades provided side by side in a circumferential direction of the rotation axis, and a rotating outer peripheral portion provided on an outer peripheral side of the plurality of blades. The motor includes a rotor side magnet provided in the rotating outer peripheral portion, and a stator side magnet provided in the outer peripheral portion to face the rotor side magnet. Among the plurality of blades, at least a predetermined portion of a first blade which is a part of the blades and at least a predetermined portion of a second blade which is the other part of the blades are located at different positions in an axial direction of the rotation axis.

According to the configuration, since the predetermined portion of the first blade and the predetermined portion of the second blade can be provided to be offset in position with respect to each other in the axial direction, the rigidity of the plurality of blades in the axial direction can be improved. For this reason, it can be suppressed that the blade is displaced in the axial direction by thrust. Therefore, it can be suppressed that the position of a portion on the free end side is displaced to a suction port side by thrust. Accordingly, it can be suppressed that the rotor side magnet and the stator side magnet of the motor are separated from each other to widen a gap therebetween, and deterioration in performance of the motor, which is due to the rotation of the blades, can be suppressed. In addition, since the wing area and the number of the plurality of blades do not need to be changed, the influence on the design of the blades can be suppressed. Incidentally, the predetermined portion is, for example, a portion on the shaft portion side (fixed end side), a portion on the outer peripheral portion side (free end side), or the entire portion (entire blade).

In addition, it is preferable that the rotor side magnet and the stator side magnet are provided to face each other in the axial direction of the rotation axis.

According to the configuration, even when the rotor side magnet and the stator side magnet are provided to face each other in the axial direction, deterioration in performance of the motor, which is due to the rotation of the blades, can be suppressed.

In addition, it is preferable that the rotor side magnet and the stator side magnet are provided to face each other in a radial direction of the rotation axis.

According to the configuration, even when the rotor side magnet and the stator side magnet are provided to face each other in the radial direction, deterioration in performance of the motor, which is due to the rotation of the blades, can be suppressed.

In addition, it is preferable that the first blade is provided closer to a suction port side than the second blade in the axial direction of the rotation axis, so that the plurality of blades are provided in multiple stages in the axial direction of the rotation axis.

According to the configuration, the plurality of blades can be categorized into the first blade and the second blade to be formed side by side in the axial direction in multiple stages. For this reason, the rigidity of the plurality of blades in the axial direction can be further improved.

In addition, it is preferable that the first blade and the second blade are alternately disposed in the circumferential direction of the rotation axis.

According to the configuration, the weight of the first blade can be uniformly balanced in the circumferential direction, and similarly, the weight of the second blade can be uniformly balanced in the circumferential direction. For this reason, it can be suppressed that during rotation of the plurality of blades, whirling of the rotating portion occurs due to an uneven distribution of the weight.

In addition, it is preferable that the second blade has a pitch angle larger than a pitch angle of the first blade, the pitch angle being an angle with respect to the circumferential direction of the rotation axis.

The fluid which has passed through the first blade flows down with respect to the second blade, namely, flows along the axial direction of the rotation axis. For this reason, when the pitch angle of the second blade is set large, thrust can be suitably generated in the second blade. In addition, when the pitch angle of the second blade is set large, the second blade can be oriented along the axial direction of the rotation axis, so that the rigidity of the second blade in the axial direction can be improved.

In addition, it is preferable that when a surface which is formed in an end portion on a suction port side when the plurality of blades rotate is assumed as a rotor plane, in the plurality of blades, the rotor plane in a portion on the outer peripheral side of the first blade and the rotor plane in a portion on the outer peripheral side of the second blade are in the same plane, and a portion on an inner peripheral side of the first blade is provided closer to the suction port side than a portion on the inner peripheral side of the second blade in the axial direction of the rotation axis, so that the rotor plane in the portion on the inner peripheral side of the first blade and the rotor plane in the portion on the inner peripheral side of the second blade are not in the same plane.

According to the configuration, the portions on the inner peripheral side (fixed end side) of the first blade and the second blade can be provided to be offset in position with respect to each other in the axial direction. For this reason, the rigidity of the inner peripheral side of the plurality of blades in the axial direction can be improved. Since the portion on the inner peripheral side of the blade makes great contribution to the displacement of the position of the outer peripheral side of the blade, the displacement of the outer peripheral side of the blade in the axial direction can be suitably suppressed by improving the rigidity of the inner peripheral side of the plurality of blades in the axial direction. In addition, since the portions on the outer peripheral side of the plurality of blades can be assumed as the rotor planes that are in the same plane, thrust can be efficiently generated.

In addition, it is preferable that when an entire length of the blade in a radial direction of the rotation axis is R, lengths of the portions on the inner peripheral side of the blades are 0.5 R or less, the portions not being in the same plane.

According to the configuration, since the portions on the outer peripheral side of the plurality of blades can be made larger than the portions on the inner peripheral side of the plurality of blades, thrust can be more efficiently generated.

According to another aspect of the present invention, there is provided a vertical takeoff and landing aircraft including: the motor-integrated fluid machine; and an airframe that is moved by thrust generated from the motor-integrated fluid machine.

According to the configuration, it is possible to provide the vertical takeoff and landing aircraft having a stable thrust due to being equipped with the motor-integrated fluid machine that suppresses deterioration in performance of the motor, which is due to the rotation of the blades.

BRIEF DESCRIPTION OF DRAWINGS

FIG. 8 is a description view schematically illustrating a periphery of blades of a motor-integrated fan according to a modification example of the first to fourth embodiments.

DESCRIPTION OF EMBODIMENTS

Hereinafter, embodiments according to the present invention will be described in detail with reference to the drawings. Incidentally, the invention is not limited by the embodiments. In addition, the components in the following embodiments include components that can be easily replaced by those skilled in the art, or components that are substantially the same. Further, the components to be described below can be appropriately combined, and when there are a plurality of embodiments, the embodiments can be combined.

First Embodiment

A motor-integrated fluid machine according to a first embodiment is an axial fluid machine. The motor-integrated fluid machine is a motor-integrated fan 1 (hereinafter, also simply referred to as a fan 1) that takes in air from a suction port and discharges the air from a discharge outlet, thus to generate thrust. Incidentally, in the first embodiment, the motor-integrated fan 1 will be described as an application of the motor-integrated fluid machine, and the motor-integrated fluid machine is not limited to the configuration. The motor-integrated fluid machine may be applied, for example, as a motor-integrated thruster such as a propeller which takes in a liquid such as water or seawater from a suction port to inject the liquid from a discharge outlet, thus to generate thrust.

The motor-integrated fan 1 is provided in, for example, a vertical takeoff and landing aircraft such as a helicopter or a drone. The motor-integrated fan 1 provided in the vertical takeoff and landing aircraft generates thrust for lifting an airframe, or generates thrust for controlling the posture of the airframe. Incidentally, the motor-integrated fan 1 may be applied to, for example, an air cushion vehicle such as a hovercraft. Further, when the motor-integrated fan 1 is applied as a motor-integrated thruster, the motor-integrated fan 1 may be applied to ships.

Figure 1:
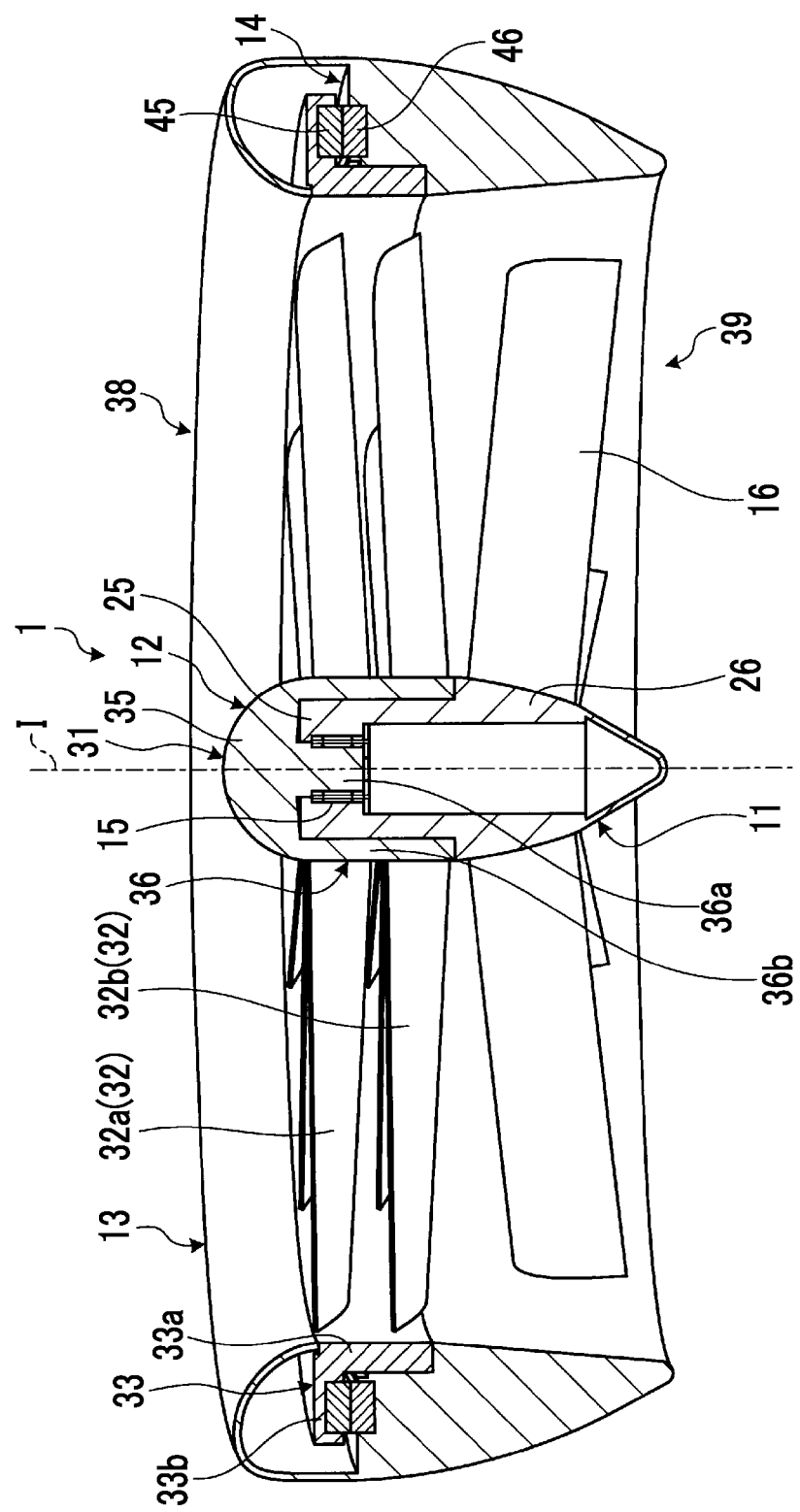
FIG. 1 is a cross-sectional view of a motor-integrated fan according to a first embodiment.

The motor-integrated fan 1 will be described with reference to FIG. 1. FIG. 1 is a cross-sectional view of the motor-integrated fan according to the first embodiment. The motor-integrated fan 1 is called a duct-type propeller or a duct fan. The motor-integrated fan 1 is used, for example, in a horizontal state in which an axial direction of a rotation axis I is a vertical direction, and takes in air from an upper side in the vertical direction and discharges the air to a lower side in the vertical direction. Incidentally, the motor-integrated fan 1 may be used in a vertical state in which the axial direction of the rotation axis I is a horizontal direction.

The motor-integrated fan 1 is a flat fan of which the length in the axial direction of the rotation axis I is shorter than the length in a radial direction of the rotation axis I. The motor-integrated fan 1 is a fan in which one motor is integrally provided, and includes a shaft portion 11, a rotating portion 12, an outer peripheral portion 13, a motor 14, a rolling bearing 15, and a guide vane 16.

The shaft portion 11 is provided at the center of the rotation axis I, and is a support system (fixed side). The axial direction of the rotation axis I is an upward and downward direction in FIG. 1, and is a direction along the vertical direction. For this reason, a flow direction of air is a direction along the axial direction of the rotation axis I, and the air flows from an upper side toward a lower side in FIG. 1. The shaft portion 11 includes a shaft side fitting portion 25 that is a portion provided on an upstream side in the axial direction of the rotation axis I, and a shaft body 26 that is a portion provided downstream of the shaft side fitting portion 25.

A hub 31 of the rotating portion 12 to be described later is fitted to the shaft side fitting portion 25. The shaft side fitting portion 25 has a cylindrical shape, and is provided to protrude from an end surface on the upstream side of the shaft body 26 in the axial direction. A space having a columnar shape is formed on a center side of the rotation axis I in the shaft side fitting portion 25. A part of the hub 31 of the rotating portion 12 is inserted into the space. In addition, an outer peripheral side of the shaft side fitting portion 25 is surrounded by a part of the hub 31 of the rotating portion 12.

The shaft body 26 has a substantially conical shape that is tapered from the upstream side toward a downstream side in the axial direction. For this reason, an outer peripheral surface of the shaft body 26 is a surface that approaches an inner side from an outer side in the radial direction as the surface extends from the upstream side toward the downstream side in the axial direction. An internal space in which a device can be installed is formed inside the shaft body 26. Examples of the device include a control device, a camera and the like. In addition, an end portion on the radial inner side of the guide vane 16 is connected to the outer peripheral surface of the shaft body 26.

Figure 2:
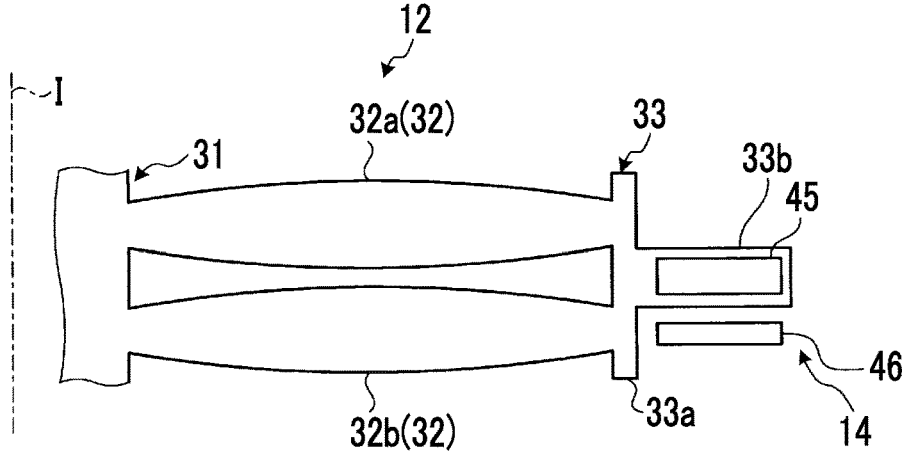
FIG. 2 is a description view schematically illustrating a periphery of blades of the motor-integrated fan according to the first embodiment.

As illustrated in FIGS. 1 and 2, the rotating portion 12 is a rotating system (rotating side) that rotates around the shaft portion 11. FIG. 2 is a cross-sectional view schematically illustrating a periphery of blades of the motor-integrated fan according to the first embodiment. The rotating portion 12 is provided on an inlet side, into which air flows, with respect to the shaft portion 11 in the axial direction of the rotation axis I. The rotating portion 12 includes the hub 31, a plurality of blades 32, and a rotating support ring (rotating outer peripheral portion) 33. The rotating portion 12 is configured such that the plurality of blades 32 are provided in multiple stages in the axial direction.

The hub 31 is provided upstream of the shaft portion 11 in the axial direction, and is rotatably fitted to the shaft side fitting portion 25. The hub 31 includes a hub body 35 that is a portion provided on the upstream side in the axial direction, and a hub side fitting portion 36 that is a portion provided downstream of the hub body 35. The hub body 35 is formed such that an end surface on the upstream side is a hemispherical surface having a predetermined radius of curvature. The hub side fitting portion 36 has a shape complementary to that of the shaft side fitting portion 25. The hub side fitting portion 36 includes a central shaft 36a provided at the center of the rotation axis, and a cylindrical portion 36b that has a cylindrical shape and is provided on an outer peripheral side of the central shaft 36a. The central shaft 36a is inserted into the space of the shaft side fitting portion 25, the space being formed at the center of the rotation axis. The cylindrical portion 36b is provided to protrude from an end surface on the downstream side of the hub body 35 in the axial direction. The cylindrical portion 36b is disposed to surround an outer periphery of the shaft side fitting portion 25. At this time, the rolling bearing 15 is provided between an inner peripheral surface of the shaft side fitting portion 25 and an outer peripheral surface of the central shaft 36a of the hub 31.

Then, a surface extending from an end surface of the hub body 35 to the outer peripheral surface of the shaft body 26 via an outer peripheral surface of the cylindrical portion 36b is a surface that is smooth without a step.

The plurality of blades 32 are provided to extend from the hub 31 toward the radial outer side, and are provided side by side at predetermined intervals in a circumferential direction. Each of the blades 32 has an airfoil shape. The plurality of blades 32 are made of a composite material. Incidentally, in the present embodiment, the plurality of blades 32 are made of a composite material; however, the material is not particularly limited, and the plurality of blades 32 may be made of, for example, a metallic material.

The plurality of blades 32 include a first blade 32a that is a part of the blades 32, and a second blade 32b that is the remaining other part of the blades 32. The first blade 32a and the second blade 32b are located at different positions in the axial direction of the rotation axis I. Specifically, the first blade 32a is provided on a suction port 38 side of the second blade 32b in the axial direction of the rotation axis I. In other words, the second blade 32b is provided on a discharge outlet 39 side of the first blade 32a in the axial direction of the rotation axis I. For this reason, the plurality of blades 32 are disposed in multiple stages (two stages) in the axial direction.

Figure 3:
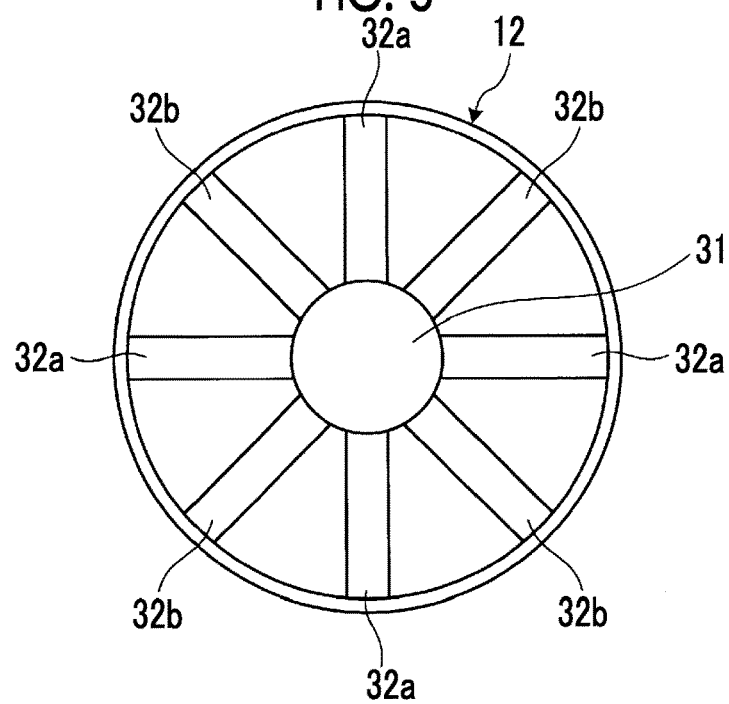
FIG. 3 is a plan view of the rotating portion of the motor-integrated fan according to the first embodiment as seen in an axial direction.

FIG. 3 is a plan view of the rotating portion of the motor-integrated fan according to the first embodiment as seen in the axial direction. As illustrated in FIG. 3, in a plan view, the first blade 32a and the second blade 32b are alternately disposed in the circumferential direction of the rotation axis I. Namely, a plurality of the first blades 32a are provided side by side at predetermined equal intervals in the circumferential direction. In addition, a plurality of the second blades 32b are provided side by side at predetermined equal intervals in the circumferential direction. Then, each of the plurality of second blades 32b is provided to be located at the center between the first blades 32a adjacent to each other in the circumferential direction.

Figure 4:
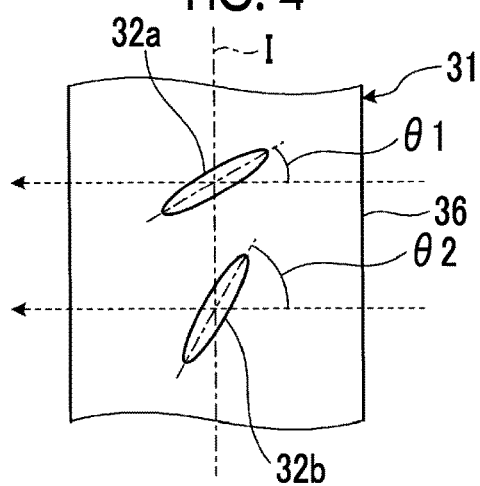
FIG. 4 is a description view of the blades of the motor-integrated fan according to the first embodiment as seen from a radial direction.

FIG. 4 is a description view of the blades of the motor-integrated fan according to the first embodiment as seen from the radial direction. As illustrated in FIG. 4, the first blade 32a and the second blade 32b have different pitch angles θ1 and θ2 that are angles with respect to the circumferential direction (rotation direction) of the rotation axis I. Incidentally, in FIG. 4, the first blade 32a and the second blade 32b are disposed side by side in the axial direction for the ease of comparison. Here, each of the pitch angles θ1 and θ2 is an angle formed by a forward and rearward direction, which connects a leading edge side (tip side in the rotation direction) and a trailing edge side (trailing end side in the rotation direction) of the blade 32, and the circumferential direction. Specifically, the pitch angle θ2 of the second blade 32*b* is larger than the pitch angle θ1 of the first blade 32*a*.

The rotating support ring 33 is formed in an annular shape centered on the rotation axis I. The rotating support ring 33 is connected to an outer peripheral side of the plurality of blades 32 in the radial direction of the rotation axis I. The rotating support ring 33 includes an inner annular portion 33*a* that is a portion forming a part of an inner peripheral surface of the outer peripheral portion 13 to be described later, and a flange portion 33*b* that is a portion provided to protrude to the radial outer side of the inner annular portion 33*a*. An inner peripheral surface on the radial inner side of the inner annular portion 33*a* is a part of the inner peripheral surface of the outer peripheral portion 13. In addition, an end portion on the radial outer side of each of the blades 32 is connected to the inner peripheral surface of the inner annular portion 33*a*. At this time, since the plurality of blades 32 are disposed in multiple stages in the axial direction, the length in the axial direction of the inner annular portion 33*a* is such a length that the plurality of blades 32 disposed in multiple stages can be connected to the inner annular portion 33*a*. The flange portion 33*b* is provided upstream of the inner annular portion 33*a* in the axial direction. The flange portion 33*b* holds a permanent magnet 45 of the motor 14 to be described later. The flange portion 33*b* holds the permanent magnet 45 such that the permanent magnet 45 faces the downstream side in the axial direction.

The rotating portion 12 is configured such that the hub 31, the plurality of blades 32, and the rotating support ring 33 are integrated, and rotates around the hub 31. In this case, when the rotating portion 12 is made of a composite material, a part or the entirety of the rotating portion 12 may be integrally molded. For example, in the rotating portion 12, the plurality of blades 32 and the rotating support ring 33 may be integrally molded of a composite material, or the hub 31, the plurality of blades 32, and the rotating support ring 33 are integrally molded of a composite material. In addition, the rotating portion 12 may be made of a metallic material, and also in this case, a part or the entirety of the rotating portion 12 may be integrated.

The outer peripheral portion 13 is provided outside the shaft portion 11 in the radial direction, and is the support system (fixed side). The outer peripheral portion 13 is a duct that is formed in an annular shape, and is caused to generate thrust by the rotation of the rotating portion 12. In the outer peripheral portion 13 (hereinafter, referred to as the duct 13), an opening on the upstream side in the axial direction of the rotation axis I is a suction port 38, and an opening on the downstream side is a discharge outlet 39. In addition, the duct 13 has a shape in which when the rotating portion 12 rotates, air is suctioned from the suction port 38, and the suctioned air is discharged from the discharge outlet 39 to generate thrust. Specifically, the inner peripheral surface of the duct 13 on the downstream side of the rotating portion 12 is a surface that is widened from the suction port 38 side toward the discharge outlet 39 side.

An internal space, which has an annular shape and accommodates the flange portion 33*b* of the rotating support ring 33 of the rotating portion 12 and a coil 46 of the motor 14 to be described later, is formed inside the duct 13. The duct 13 holds the coil 46 thereinside, the coil 46 being provided at a position facing the permanent magnet 45 held by the rotating portion 12.

The motor 14 is an outer peripheral drive motor that applies power from a duct 13 side toward the rotating portion 12 to cause the rotating portion 12 to rotate. The motor 14 includes a rotor side magnet provided on a rotating portion 12 side, and a stator side magnet provided on the duct 13 side. In the first embodiment, the rotor side magnet is the permanent magnet 45, and the stator side magnet is the coil 46 which is an electromagnet.

The permanent magnets 45 are provided to be held by the flange portion 33*b* of the rotating support ring 33, and are disposed in an annular shape in the circumferential direction. In addition, the permanent magnets 45 are configured such that positive poles and negative poles alternate at predetermined intervals in the circumferential direction. Incidentally, the permanent magnets 45 may be in a Halbach array. The permanent magnet 45 is provided at a position facing the coil 46 in the axial direction of the rotation axis I. The length of the permanent magnet 45 in the radial direction of the rotation axis I is longer than the length thereof in the axial direction of the rotation axis I.

A plurality of the coils 46 are provided to be held inside the duct 13, to face the poles of the permanent magnets 45, and side by side in the circumferential direction. The coil 46 is provided at the position facing the permanent magnet 45, which is held by the rotating portion 12, in the axial direction of the rotation axis I. Namely, the permanent magnet 45 and the coil 46 are disposed to face each other in the axial direction of the rotation axis I, which is an axial disposition.

The rolling bearing 15 is provided between the inner peripheral surface of the shaft side fitting portion 25 of the shaft portion 11 and the outer peripheral surface of the central shaft 36*a* of the hub 31 of the rotating portion 12. The rolling bearing 15 connects the shaft portion 11 and the rotating portion 12 while allowing the rotating portion 12 to rotate with respect to the shaft portion 11. The rolling bearing 15 is, for example, a ball bearing or the like.

The guide vane 16 is provided to connect the shaft portion 11 and the duct 13. The guide vane 16 is provided downstream of the rotating portion 12 in the axial direction of the rotation axis I. Namely, the guide vane 16 is provided at the position of a downstream portion 43 of the duct 13 in the axial direction. A plurality of the guide vanes 16 are provided side by side in the circumferential direction of the rotation axis I. In addition, the guide vane 16 has a streamlined shape such as a airfoil shape, and rectifies air, which flows from the rotating portion 12, to generate thrust. Incidentally, the shape of the guide vane 16 is not limited to a airfoil shape, and may be a plate shape.

In the motor-integrated fan 1 described above, power generated by a magnetic field is applied from the duct 13 side to the rotating portion 12 by the motor 14, so that the rotating portion 12 rotates. When the rotating portion 12 rotates, the motor-integrated fan 1 suctions air from the suction port 38, and discharges the air toward the discharge outlet 39. The air discharged from the rotating portion 12 flows along the inner peripheral surface of the duct 13 to generate thrust. At this time, the flow of the air is rectified by the guide vanes 16, so that thrust is also generated by the guide vanes 16.

In addition, when the rotating portion 12 rotates, the air suctioned from the suction port 38 passes through the first blades 32*a*. The air which has passed through the first blade 32*a* flows down with respect to the second blade 32*b*, namely, flows along the axial direction of the rotation axis I. After the air flowing down passes through the second blades 32*b* to be rectified by the guide vanes 16, the air is discharged from the discharge outlet 39.

As described above, according to the first embodiment, since the first blade 32*a* and the second blade 32*b* can be formed in multiple stages so as to be offset in position with respect to each other in the axial direction, the rigidity of the plurality of blades 32 in the axial direction can be improved. For this reason, it can be suppressed that the blade 32 is displaced in the axial direction by thrust. Therefore, it can be suppressed that the position of the portion on the free end side which is the outer peripheral side is displaced to the suction port 38 side by thrust. Accordingly, it can be suppressed that the permanent magnet 45 and the coil 46 of the motor 14 are separated from each other to widen a gap therebetween, and deterioration in performance of the motor 14, which is due to the rotation of the blades 32, can be suppressed. In addition, since the wing area and the number of the plurality of blades 32 do not need to be changed, the influence on the design of the blades 32 can be suppressed.

In addition, according to the first embodiment, the first blade 32a and the second blade 32b can be alternately disposed in the circumferential direction of the rotation axis I. For this reason, the weight of the first blade 32a can be uniformly balanced in the circumferential direction, and similarly, the weight of the second blade 32b can be uniformly balanced in the circumferential direction. Accordingly, it can be suppressed that during rotation of the plurality of blades 32, whirling of the rotating portion 12 occurs due to an uneven distribution of the weight.

In addition, according to the first embodiment, since the pitch angle θ2 of the second blade 32b can be set larger than the pitch angle el of the first blade 32a, even when the air which has passed through the first blades 32a flows down to the second blades 32b, thrust can be suitably generated in the second blades 32b. In addition, when the pitch angle θ2 of the second blade 32b is set large, the wing chord length of the second blade 32b can be oriented along the axial direction of the rotation axis I, so that the rigidity of the second blade 32b in the axial direction can be improved.

In addition, according to the first embodiment, it is possible to provide the vertical takeoff and landing aircraft having a stable thrust due to being equipped with the motor-integrated fan 1 that suppresses deterioration in performance of the motor 14, which is due to the rotation of the blades 32.

Second Embodiment

Figure 5:
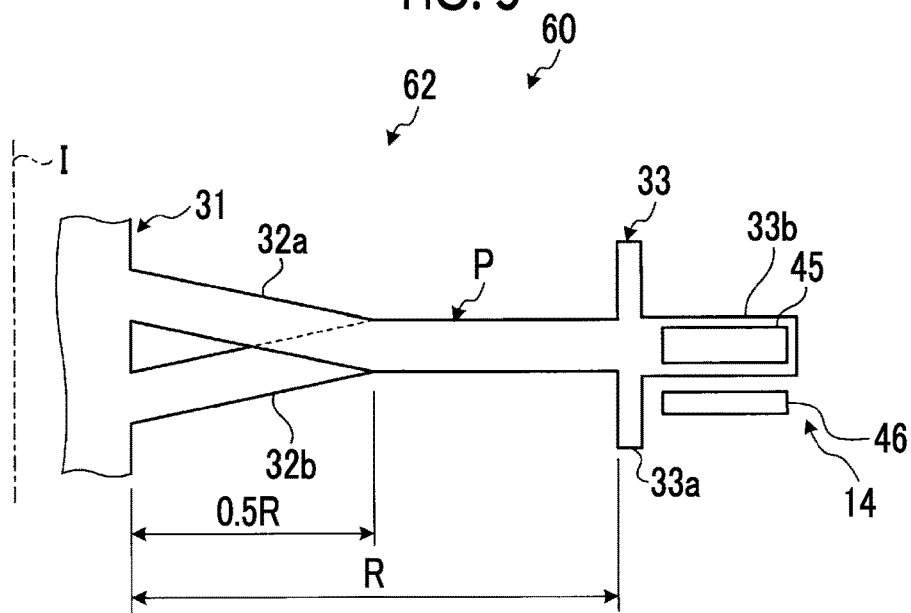
FIG. 5 is a description view schematically illustrating a periphery of blades of a motor-integrated fan according to a second embodiment.

Next, a motor-integrated fan 60 according to a second embodiment will be described with reference to FIG. 5. Incidentally, in the second embodiment, in order to avoid duplicated description, parts different from those in the first embodiment will be described, and parts having the same configurations as those in the first embodiment will be described with the same reference signs. FIG. 5 is a description view schematically illustrating a periphery of blades of the motor-integrated fan according to the second embodiment.

The motor-integrated fan 60 of the second embodiment is formed by modifying the blade 32 of the motor-integrated fan 1 of the first embodiment. In a rotating portion 62 of the motor-integrated fan 60 of the second embodiment, the plurality of blades 32 include the first blade 32a and the second blade 32b. A portion on an inner peripheral side of the first blade 32a and a portion on the inner peripheral side of the second blade 32b are located at different positions in the axial direction of the rotation axis I. Meanwhile, a portion on the outer peripheral side of the first blade 32a and a portion on the outer peripheral side of the second blade 32b are located at the same position in the axial direction of the rotation axis I.

Specifically, a surface which is formed in an end portion on the suction port 38 side of each of the blades 32 when the plurality of blades 32 rotate is assumed as a rotor plane P. The portion on the inner peripheral side of the first blade 32a is located on the suction port 38 side with respect to the rotor plane P in the portion on the outer peripheral side of the first blade 32a in the axial direction of the rotation axis I, and is inclined to the discharge outlet 39 as the first blade 32a extends toward the outer peripheral side. The portion on the inner peripheral side of the second blade 32b is located on the discharge outlet 39 side with respect to the rotor plane P in the portion on the outer peripheral side of the second blade 32b in the axial direction of the rotation axis I, and is inclined to the suction port 38 as the second blade 32b extends toward the outer peripheral side.

Further, the rotor plane P in the portion on the outer peripheral side of the first blade 32a and the rotor plane P in the portion on the outer peripheral side of the second blade 32b are in the same plane. Meanwhile, the rotor plane P in the portion on the inner peripheral side of the first blade 32a and the rotor plane P in the portion on the inner peripheral side of the second blade 32b are not in the same plane.

In addition, when the entire length (wing length) of the blade 32 in the radial direction of the rotation axis I is R, the lengths of the portions on the inner peripheral side of the blades 32 are 0.5 R or less, the portions not being in the same plane.

As described above, according to the second embodiment, since the portions on the inner peripheral side (fixed end side) of the first blade 32a and the second blade 32b can be provided to be offset in position with respect to each other in the axial direction, the rigidity of the inner peripheral side of the plurality of blades 32 in the axial direction can be improved. Since the portion on the inner peripheral side of the blade 32 makes great contribution to the displacement of the position of the outer peripheral side of the blade 32, the displacement of the outer peripheral side of the blade 32 in the axial direction can be suitably suppressed by improving the rigidity of the inner peripheral side of the blade 32 in the axial direction. In addition, since the portions on the outer peripheral side of the plurality of blades 32 can be assumed as the rotor planes P that are in the same plane, thrust can be efficiently generated.

In addition, according to the second embodiment, since the portions on the outer peripheral side of the plurality of blades 32 can be made larger than the portions on the inner peripheral side of the plurality of blades 32, thrust can be more efficiently generated.

Incidentally, in the second embodiment, the portions on the inner peripheral side (fixed end side) of the first blade 32a and the second blade 32b are provided to be offset in position with respect to each other in the axial direction; however, the present invention is not particularly limited to the configuration. The portions on the outer peripheral side (free end side) of the first blade 32a and the second blade 32b may be provided to be offset in position with respect to each other in the axial direction. In this case, the portions on the inner peripheral side (fixed end side) of the first blade 32a and the second blade 32b are the rotor planes P that are in the same plane.

Third Embodiment

Figure 6:
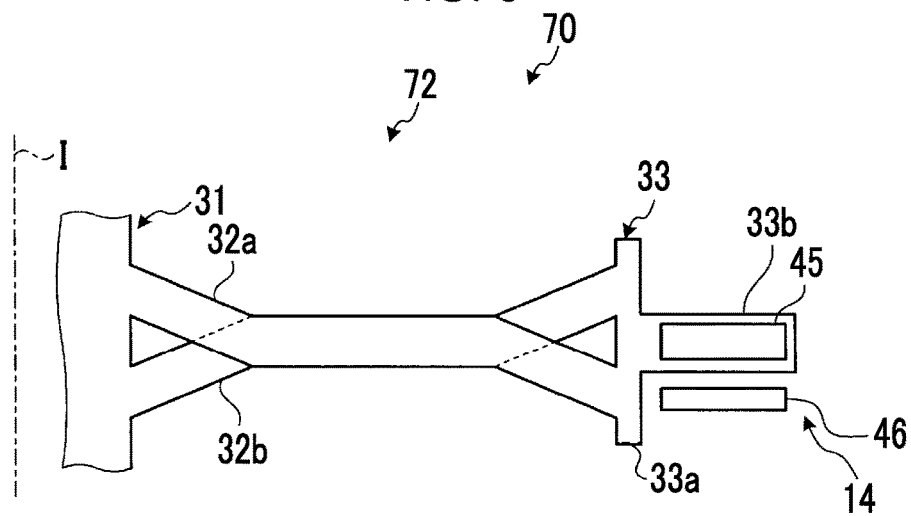
FIG. 6 is a description view schematically illustrating a periphery of blades of a motor-integrated fan according to a third embodiment.

Next, a motor-integrated fan 70 according to a third embodiment will be described with reference to FIG. 6. Incidentally, also in the third embodiment, in order to avoid duplicated description, parts different from those in the first and second embodiments will be described, and parts having the same configurations as those in the first and second embodiments will be described with the same reference signs. FIG. 6 is a description view schematically illustrating a periphery of blades of the motor-integrated fan according to the third embodiment.

The motor-integrated fan 70 of the third embodiment is formed by modifying the blade 32 of the motor-integrated fan 60 of the second embodiment. In the rotating portion 72 of the motor-integrated fan 70 of the third embodiment, the plurality of blades 32 include the first blade 32a and the second blade 32b. The portions on the inner peripheral side and the outer peripheral side of the first blade 32a and the portions on the inner peripheral side and the outer peripheral side of the second blade 32b are located at different positions in the axial direction of the rotation axis I, respectively. Meanwhile, a central portion of the first blade 32a and a central portion of the second blade 32b are located at the same position in the axial direction of the rotation axis I.

Specifically, a surface which is formed in an end portion on the suction port 38 side of the blade 32 when the plurality of blades 32 rotate is assumed as a rotor plane P. The portion on the inner peripheral side of the first blade 32a is located on the suction port 38 side with respect to the rotor plane P in the central portion of the first blade 32a in the axial direction of the rotation axis I, and is inclined to the discharge outlet 39 as the first blade 32a extends toward the outer peripheral side. In addition, the portion on the outer peripheral side of the first blade 32a is located on the discharge outlet 39 side with respect to the rotor plane P in the central portion of the first blade 32a in the axial direction of the rotation axis I, and is inclined to the suction port 38 as the first blade 32a extends toward the inner peripheral side. The portion on the inner peripheral side of the second blade 32b is located on the discharge outlet 39 side with respect to the rotor plane P in the central portion of the second blade 32b in the axial direction of the rotation axis I, and is inclined to the suction port 38 as the second blade 32b extends toward the outer peripheral side. In addition, the portion on the outer peripheral side of the second blade 32b is located on the suction port 38 side with respect to the rotor plane P in the central portion of the second blade 32b in the axial direction of the rotation axis I, and is inclined to the discharge outlet 39 as the second blade 32b extends toward the inner peripheral side.

In addition, the rotor plane P in the central portion of the first blade 32a and the rotor plane P in the central portion of the second blade 32b are in the same plane. Meanwhile, the rotor plane P in the portion on the inner peripheral side of the first blade 32a and the rotor plane P in the portion on the inner peripheral side of the second blade 32b are not in the same plane. Similarly, the rotor plane P in the portion on the outer peripheral side of the first blade 32a and the rotor plane P in the portion on the outer peripheral side of the second blade 32b are not in the same plane.

As described above, according to the third embodiment, the portions on the inner peripheral side of the first blade 32a and the second blade 32b can be offset in position with respect to each other in the axial direction, and the portions on the outer peripheral side of the first blade 32a and the second blade 32b can be offset in position with respect to each other in the axial direction. For this reason, the rigidity of the inner peripheral side and the outer peripheral side of the plurality of blades 32 in the axial direction can be improved.

Incidentally, in the third embodiment, the rotor planes P in the central portions of the first blade 32a and the second blade 32b are in the same plane; however, the present invention is not limited to the configuration, the central portions may also be inclined. Namely, the first blade 32a may be inclined to the discharge outlet 39 as the first blade 32a extends from the inner peripheral side toward the outer peripheral side, and the second blade 32b may be inclined to the suction port 38 as the second blade 32b extends from the inner peripheral side toward the outer peripheral side.

Fourth Embodiment

Figure 7:
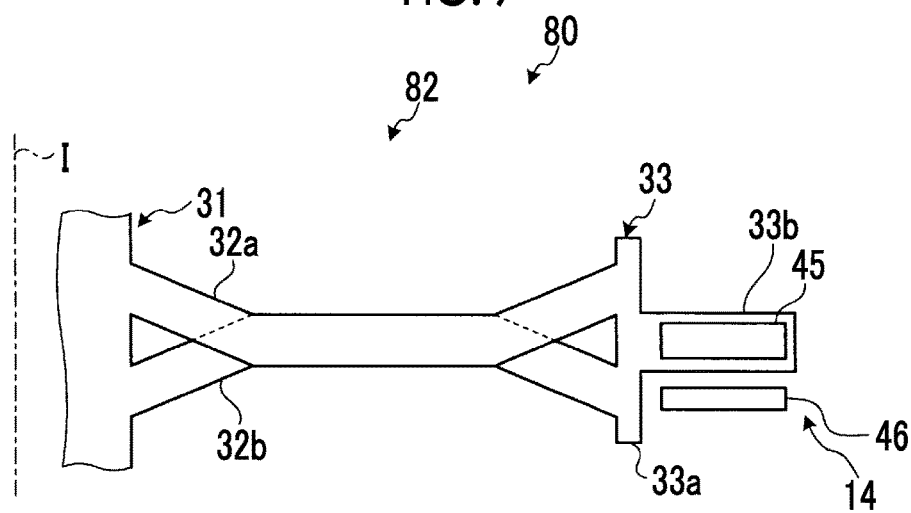
FIG. 7 is a description view schematically illustrating a periphery of blades of a motor-integrated fan according to a fourth embodiment.

Next, a motor-integrated fan 80 according to a fourth embodiment will be described with reference to FIG. 7. Incidentally, also in the fourth embodiment, in order to avoid duplicated description, parts different from those in the first to third embodiments will be described, and parts having the same configurations as those in the first to third embodiments will be described with the same reference signs. FIG. 7 is a description view schematically illustrating a periphery of blades of the motor-integrated fan according to the fourth embodiment.

The motor-integrated fan 80 of the fourth embodiment is formed by modifying the blade 32 of the motor-integrated fan 70 of the third embodiment. In a rotating portion 82 of the motor-integrated fan 80 of the fourth embodiment, the plurality of blades 32 include the first blade 32a and the second blade 32b. Similar to the third embodiment, the portions on the inner peripheral side and the outer peripheral side of the first blade 32a and the portions on the inner peripheral side and the outer peripheral side of the second blade 32b are located at different positions in the axial direction of the rotation axis I, respectively. Meanwhile, a central portion of the first blade 32a and a central portion of the second blade 32b are located at the same position in the axial direction of the rotation axis I.

Specifically, a surface which is formed in an end portion on the suction port 38 side of the blade 32 when the plurality of blades 32 rotate is assumed as a rotor plane P. The portion on the inner peripheral side of the first blade 32a is located on the suction port 38 side with respect to the rotor plane P in the central portion of the first blade 32a in the axial direction of the rotation axis I, and is inclined to the discharge outlet 39 as the first blade 32a extends toward the outer peripheral side. In addition, the portion on the outer peripheral side of the first blade 32a is located on the suction port 38 side with respect to the rotor plane P in the central portion of the first blade 32a in the axial direction of the rotation axis I, and is inclined to the discharge outlet 39 as the first blade 32a extends toward the inner peripheral side. The portion on the inner peripheral side of the second blade 32b is located on the discharge outlet 39 side with respect to the rotor plane P in the central portion of the second blade 32b in the axial direction of the rotation axis I, and is inclined to the suction port 38 as the second blade 32b extends toward the outer peripheral side. In addition, the portion on the outer peripheral side of the second blade 32b is located on the discharge outlet 39 side with respect to the rotor plane P in the central portion of the second blade 32b in the axial direction of the rotation axis I, and is inclined to the suction port 38 as the second blade 32b extends toward the inner peripheral side.

In addition, similar to the third embodiment, the rotor plane P in the central portion of the first blade 32a and the rotor plane P in the central portion of the second blade 32b are in the same plane. Meanwhile, the rotor plane P in the portion on the inner peripheral side of the first blade 32a and the rotor plane P in the portion on the inner peripheral side of the second blade 32b are not in the same plane. Similarly, the rotor plane P in the portion on the outer peripheral side of the first blade 32a and the rotor plane P in the portion on the outer peripheral side of the second blade 32b are not in the same plane.

As described above, according to the fourth embodiment, the portions on the inner peripheral side of the first blade 32a and the second blade 32b can be offset in position with respect to each other in the axial direction, and the portions on the outer peripheral side of the first blade 32a and the second blade 32b can be offset in position with respect to each other in the axial direction. For this reason, the rigidity of the inner peripheral side and the outer peripheral side of the plurality of blades 32 in the axial direction can be improved.

Incidentally, in the third and fourth embodiments, the portion on the inner peripheral side of the first blade 32a and the portion on the inner peripheral side of the second blade 32b are not in the same plane, the portion on the outer peripheral side of the first blade 32a and the portion on the outer peripheral side of the second blade 32b are not in the same plane, and the central portion of the first blade 32a and the central portion of the second blade 32b are in the same plane; however, the present invention is not limited to the configuration. For example, the portion on the inner peripheral side of the first blade 32a and the portion on the inner peripheral side of the second blade 32b may be in the same plane, the portion on the outer peripheral side of the first blade 32a and the portion on the outer peripheral side of the second blade 32b may be in the same plane, and the central portion of the first blade 32a and the central portion of the second blade 32b may not be in the same plane.

In addition, in the first to fourth embodiments, the permanent magnet 45 and the coil 46 are disposed to face each other in the axial direction of the rotation axis I, which is an axial disposition, but may be disposed as in a modification example illustrated in FIG. 8. FIG. 8 is a description view schematically illustrating a periphery of blades of a motor-integrated fan according to a modification example of the first to fourth embodiments. In the modification example illustrated in FIG. 8, the permanent magnet 45 and the coil 46 are disposed to face each other in the radial direction of the rotation axis I, which is a radial disposition. Incidentally, FIG. 8 is a view in which the modification example is applied to the motor-integrated fan 1 of the first embodiment.

In the rotating support ring 33 holding the permanent magnet 45, the permanent magnet 45 is held by the flange portion 33b provided on the outer peripheral side of the inner annular portion 33a.

The permanent magnet 45 is provided on the outer peripheral side of the inner annular portion 33a of the rotating support ring 33, and is held by the flange portion 33b. The permanent magnets 45 are disposed in an annular shape in the circumferential direction. The permanent magnet 45 is provided at a position facing the coil 46 in the radial direction of the rotation axis I.

A plurality of the coils 46 are provided to be held inside the duct 13, to face the poles of the permanent magnets 45, and side by side in the circumferential direction. The coil 46 is provided at a position facing the permanent magnet 45, which is held by the rotating portion 12, in the radial direction of the rotation axis I. As described above, the permanent magnet 45 and the coil 46 may be disposed to face each other in the radial direction of the rotation axis I, which is a radial disposition.

REFERENCE SIGNS LIST

1 Motor-integrated fan (first embodiment)
11 Shaft portion
12 Rotating portion (first embodiment)
13 Duct
14 Motor
15 Rolling bearing
16 Guide vane
31 Hub
32 Blade
33 Rotating support ring
38 Suction port
39 Discharge outlet
45 Permanent magnet
46 Coil
60 Motor-integrated fan (second embodiment)
62 Rotating portion (second embodiment)
70 Motor-integrated fan (third embodiment)
72 Rotating portion (third embodiment)
80 Motor-integrated fan (fourth embodiment)
82 Rotating portion (fourth embodiment)

The invention claimed is:

1. A motor-integrated fluid machine to suction a fluid from a suction port and discharge the suctioned fluid from a discharge outlet, the machine comprising:
   a shaft portion at a center of a rotation axis;
   a rotating portion configured to rotate around the shaft portion;
   an outer peripheral portion on an outer periphery of the shaft portion; and
   a motor configured to rotate the rotating portion,
   wherein the rotating portion is rotatably supported on the shaft portion so that a shaft portion side is a fixed end side and an outer peripheral portion side is a free end side,
   wherein the motor is an outer peripheral drive motor configured to apply power from the outer peripheral portion to rotate the rotating portion,
   wherein the rotating portion includes:
      a plurality of blades arranged side by side in a circumferential direction of the rotation axis, and
      a rotating outer peripheral portion on an outer peripheral side of the plurality of blades,
   wherein the motor includes:
      a rotor side magnet in the rotating outer peripheral portion, and
      a stator side magnet in the outer peripheral portion facing the rotor side magnet,
   wherein the plurality of blades includes a first blade and a second blade,
   wherein at least a predetermined portion of the first blade and at least a predetermined portion of the second blade are located at different positions in an axial direction of the rotation axis,
   wherein the first blade is closer to a suction port side than the second blade in the axial direction of the rotation axis such that the plurality of blades are provided in multiple stages in the axial direction of the rotation axis, and
   wherein the second blade has a pitch angle larger than a pitch angle of the first blade, the pitch angle being an angle with respect to the circumferential direction of the rotation axis.

2. The motor-integrated fluid machine according to claim 1, wherein the rotor side magnet and the stator side magnet face each other in the axial direction of the rotation axis.

3. The motor-integrated fluid machine according to claim 1, wherein the rotor side magnet and the stator side magnet face each other in a radial direction of the rotation axis.

4. The motor-integrated fluid machine according to claim 1, wherein:
the first blade is one of a plurality of first blades of the plurality of blades, and the second blade is one of a plurality of second blades of the plurality of blades, and
the first blades and the second blades are alternately disposed in the circumferential direction of the rotation axis.

5. A vertical takeoff and landing aircraft comprising:
the motor-integrated fluid machine according to claim 1; and
an airframe moveable by thrust generated from the motor-integrated fluid machine.

6. A motor-integrated fluid machine to suction a fluid from a suction port and discharge the suctioned fluid from a discharge outlet, the machine comprising:
a shaft portion at a center of a rotation axis;
a rotating portion configured to rotate around the shaft portion;
an outer peripheral portion on an outer periphery of the shaft portion; and
a motor configured to rotate the rotating portion,
wherein the rotating portion is rotatably supported on the shaft portion so that a shaft portion side is a fixed end side and an outer peripheral portion side is a free end side,
wherein the motor is an outer peripheral drive motor configured to apply power from the outer peripheral portion to rotate the rotating portion,
wherein the rotating portion includes:
a plurality of blades provided side by side in a circumferential direction of the rotation axis, and
a rotation outer peripheral portion provided on an outer peripheral side of the plurality of blades,
wherein the motor includes:
a rotor side magnet in the rotation outer peripheral portion, and
a stator side magnet in the outer peripheral portion facing the rotor side magnet,
wherein the plurality of blades includes a first blade and a second blade,
wherein at least a predetermined portion of the first blade and at least a predetermined portion of the second blade are located at different positions in an axial direction of the rotation axis, and
wherein a surface formed in an end portion on a suction port side of each of the plurality of blades during rotation is defined as a rotor plane, and
wherein, in the plurality of blades, the rotor plane in a portion on an outer peripheral side of the first blade and the rotor plane in a portion on an outer peripheral side of the second blade are in the same plane, and wherein a portion on an inner peripheral side of the first blade is closer to the suction port side than a portion on an inner peripheral side of the second blade in the axial direction of the rotation axis such that the rotor plane in the portion on the inner peripheral side of the first blade and the rotor plane in the portion on the inner peripheral side of the second blade are not in the same plane.

7. The motor-integrated fluid machine according to claim 6, wherein an entire length of each of the plurality of blades in a radial direction of the rotation axis is R, lengths of the portions on the inner peripheral side of each blade which forms the rotor plane is 0.5 R or less, and the portions on the inner peripheral side are not in the same plane.

8. A vertical takeoff and landing aircraft comprising:
the motor-integrated fluid machine according to claim 6; and
an airframe moveable by thrust generated from the motor-integrated fluid machine.

* * * * *